S. R. McCLAY.
ANTISLIPPING DEVICE FOR VEHICLE WHEELS.
APPLICATION FILED AUG. 7, 1916.
1,341,331. Patented May 25, 1920.
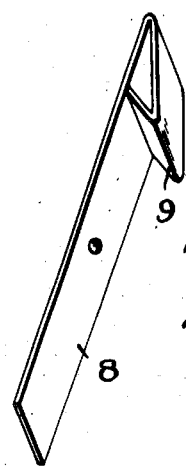
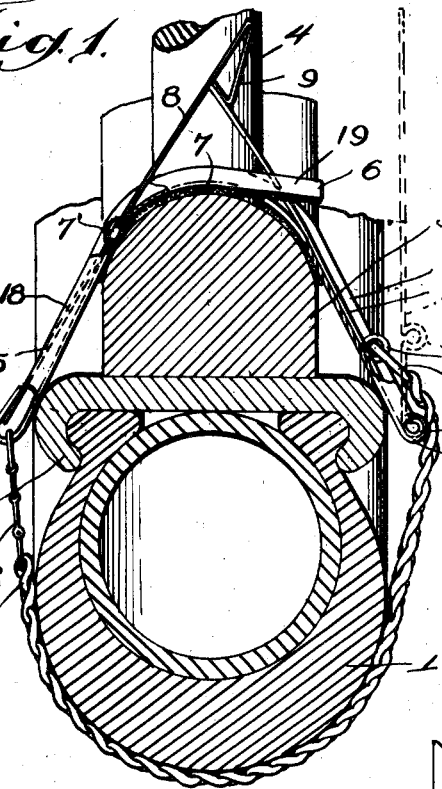
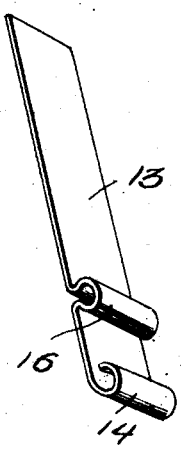
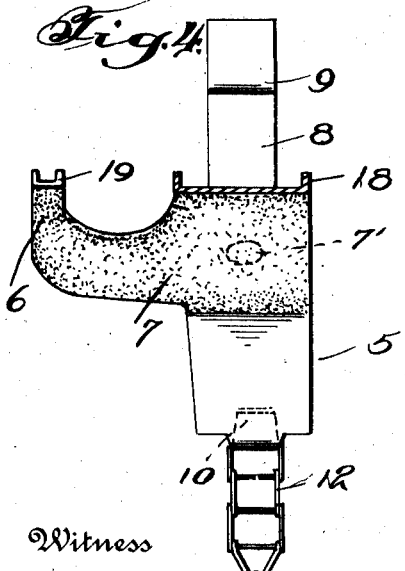
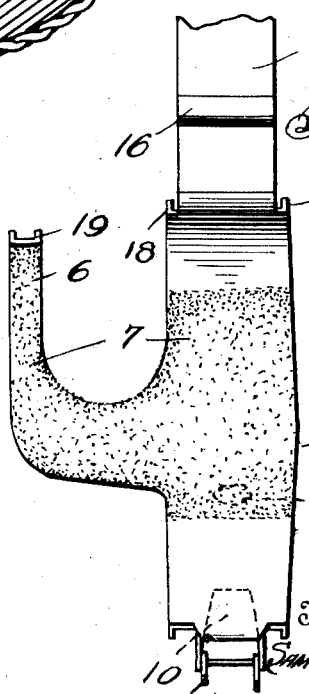

UNITED STATES PATENT OFFICE.

SAMUEL R. McCLAY, OF CANTON, OHIO.

ANTISLIPPING DEVICE FOR VEHICLE-WHEELS.

1,341,331.  Specification of Letters Patent. Patented May 25, 1920.

Application filed August 7, 1916. Serial No. 113,431.

*To all whom it may concern:*

Be it known that I, SAMUEL R. McCLAY, a citizen of the United States, residing at Canton, in the county of Stark and State of Ohio, have invented a new and useful Antislipping Device for Vehicle-Wheels, of which the following is a specification.

The present invention has reference to antislipping devices for vehicle wheels such as are commonly used upon automobiles, motorcycles and other vehicles wherein rubber tires are employed.

The objects of the present invention are, first, to provide simple means for connecting a series of chains or antislipping devices to the periphery of a vehicle tire, regardless of the specific construction of the tire, second, to provide means whereby the chains can be easily clamped upon the tire, third, to secure the chains upon the tires, and fourth, to provide means for quickly and easily removing the same.

These objects, together with other objects readily apparent to those skilled in the art, may be attained by the construction illustrated in the accompanying drawings, although the invention may be embodied in other forms, the construction illustrated being chosen by way of example.

In the accompanying drawing:

Figure 1 is a transverse section of a tire, together with the different parts belonging thereto, showing a portion of one of the spokes.

Fig. 2 is a perspective view of the hooked retaining bar.

Fig. 3 is a perspective view of the chain clamping lever.

Fig. 4 is a view showing in section the saddle and illustrating the spoke engaging arm, also showing a portion of the chain clamping lever and a portion of the chain.

Fig. 5 is a similar view showing the inner surface of the saddle and illustrating the chain locking lever connected thereto, also showing a portion of the chain.

Similar numerals of reference indicate corresponding parts throughout all the figures of the drawing.

In the accompanying drawing, 1 represents in a conventional manner the tire and 2 represents the clencher rim, 3 the felly and 4 a spoke. These parts within themselves form no specific part of the present invention, but must be present in order to carry out the objects described. It will be understood that I lay no claim to any specific form of tire.

5 represents a saddle which is substantially of the form shown in Fig. 5 and as shown it is provided with the spoke engaging prong 6, said prong being for the purpose of holding the saddle in proper position and against accidental displacement. For the purpose of preventing any marring I prefer to place upon the felly contact surface of the saddle and the prong a sheet of felt 7 or other fibrous material, which may be attached in any convenient and well known manner.

To the saddle 5 is attached by means of the rivet 7' or its equivalent the retaining bar 8, one end of which is provided with the hook 9, which hook may be formed as shown, but it is obvious that other forms may be employed for the purpose hereinafter described.

One side of the saddle 5 is provided with the hook 10 and the plain end of the retaining bar 8 inserted under the hook, by which arrangement a snap hook is produced, which snap hook is for the purpose of connecting the chain 11 to the saddle 5 by means of the open links 12. It is well understood that the cross diameters of tires vary and in order to provide for the proper attaching and clamping of the chains 11 I prefer to employ a series of links 12 so that the length of the chain as between its attaching points can be varied as circumstances may require.

To the saddle 5 is pivotally attached the chain clamping lever 13 by means of the open fold 14 and the hook 15, said fold and hook being so formed that the lever 13 can be easily detached when desired. The lever 13 is provided with the link attaching fold 16 located a short distance from the pivotal end of said lever. To this fold 16 is attached the end link 17 of the chain 11. In practice one end of the chain 11 will be permanently secured within the fold 16 and in applying the chain to the tire the other end of the chain will be snapped into the hook 10, the chain passed around the tire as shown in Fig. 1 and the lever 13 attached upon the saddle, the innermost end of the lever being inserted as shown beneath the hook 9. It will be obvious that where tires of greater or less diameter are to be equipped with my device it will be necessary to adjust the chain 11 by placing different ones of the links 12 in the hook 10. In order to properly clamp the chain the lever is turned upon the pivotal point so as to bring the outer end directly under and in engagement with the hook 9, thereby securing the lever in fixed relative position.

It will be understood that the retaining bar 8 should be formed of spring material, but of sufficient stiffness to prevent any accidental displacement of the lever 13 after the same has been brought into position to hold the chain snugly upon the periphery of the tire. In the drawing I have illustrated but one chain, and its parts, but in use it will be understood that any desired number of chains and their parts may be employed, the number being governed by the size of the wheel and the distance apart the chains are to be placed, but the construction is substantially the same regardless of the number employed.

The saddle 5 is preferably formed of sheet metal and for convenience in handling and for other obvious reasons the saddle should be light, material being used of the proper strength for the purpose designed and in order to so construct the saddle the edges of the same are provided with the outstanding flanges 18, which flanges also act as guides in bringing the lever 13 in position. The prong 6 is also provided with flanges 19 for the purpose of giving the prong the desired rigidity and preventing any accidental bending or twisting of the prong.

Having fully described my invention, what I claim as new and desire to secure by Letters Patent, is—

1. In a device of the character described, the combination of a saddle adapted to fit the felly of a wheel, said saddle provided with a hook, a retaining bar, one end of said retaining bar located under the hook formed upon the saddle, a lever pivotally connected to the saddle, a chain secured at one of its ends to the lever intermediate the ends of the lever, the opposite end of the chain connected to the saddle and means for holding the lever in locked position.

2. In a device of the character described, the combination of a saddle portion adapted to fit the felly of a wheel, a hook formed upon the saddle and one end of a retaining bar located within said hook, a lever pivotally connected to the saddle upon the opposite side of the felly from the said retaining bar, a chain adapted to be adjustably secured at one end to the said hook and to be passed transversely of the exterior of a tire upon the said wheel, the opposite end of the chain being connected to the saddle and means for holding the lever in locked position.

In testimony that I claim the above I have hereunto subscribed my name.

SAMUEL R. McCLAY.